Figure 1:
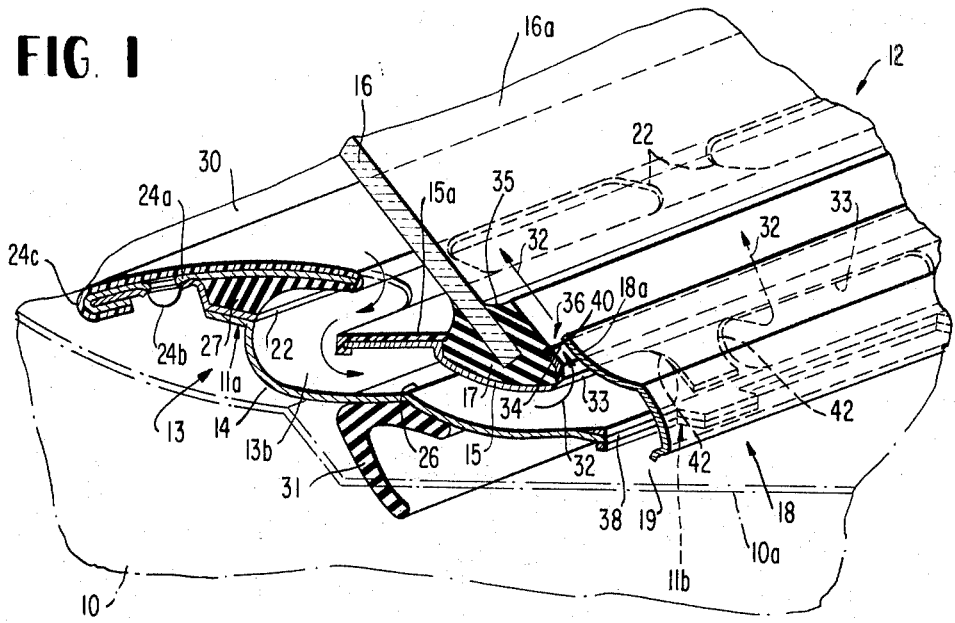

United States Patent
Götz

[15] 3,670,640
[45] June 20, 1972

[54] ROOF TOP FOR MOTOR VEHICLES

[72] Inventor: Hans Götz, Sindelfingen, Germany

[73] Assignee: Daimler-Benz Aktiengesellschaft

[22] Filed: May 20, 1970

[21] Appl. No.: 39,090

[30] Foreign Application Priority Data

May 24, 1969  Germany..................P 19 26 612.7

[52] U.S. Cl. ..................................................98/2.18
[51] Int. Cl. ..................................................B60h 1/24
[58] Field of Search..................98/2, 2.04, 2.08, 2.09, 2.1, 98/2.16–2.19

[56] References Cited

UNITED STATES PATENTS

| | | |
|---|---|---|
| 2,173,893 | 9/1939 | Wermich..................98/2.10 |
| 2,837,018 | 6/1958 | Haltenberger..................98/2.10 |
| 3,059,562 | 10/1962 | Sturtevant..................98/2.18 |
| 3,286,617 | 11/1966 | Shirk..................98/2.18 |
| 3,406,622 | 10/1968 | Gotz..................98/2.04 |

Primary Examiner—Meyer Perlin
Attorney—Craig, Antonelli & Hill

[57] ABSTRACT

A roof top for motor vehicles which is adapted to be detachably secured to the lower vehicle body and which includes a lower rear cross frame that forms a relatively wide gap with the top side of the rear part of the vehicle body; this gap which terminates at its rear end in the atmosphere, forms part of a line system of a ventilation installation for the passenger space; a ventilating channel is branched off from this line system whose air flow fans the outer surface of the rear window.

20 Claims, 2 Drawing Figures

PATENTED JUN 20 1972  3,670,640

INVENTOR
HANS GOETZ

BY Craig, Antonelli
Stewart & Hill
ATTORNEYS

ROOF TOP FOR MOTOR VEHICLES

The present invention relates to a detachable roof top for motor vehicles whose lower rear cross frame forms a relatively wide gap channel with the surface of the vehicle body lower portion, which gap channel terminates at its rear end in the atmosphere, and in which a ventilation system provided at the lower cross frame and in communication with the vehicle passenger space terminates in the gap channel. The present invention essentially consists in that at least one ventilation channel is branched off from the communicating line system formed by the ventilation installation and the gap channel, whose air flow ventilates the outer surface of the rear window of the vehicle top. It is achieved by the present invention that the outer surface of the rear window is kept free of moisture and can be made snow-free and ice-free in a simple manner.

If the arrangement is made in such a manner that one or several discharge apertures of the line system for the ventilation of the rear window outer surface are so arranged at the lower window edge or in proximity thereto that the discharged ventilation flow is directed toward the upper window edge, one achieves a reinforcement of the ventilation flow by the energy of the rotating air turbulence or vortex having an axis disposed transversely to the driving direction. This air vortex or eddy occurs within the area of the rear window — luggage space lid in vehicles with a step-like rear body shape. The air particles of this vortex or eddy flow in proximity of the rear window from the bottom to the top, i.e., in a generally upward direction.

In order to avoid that the air flow at the discharge apertures for the ventilation of the rear window outer surface is impaired by the water masses carried off by the rear window pane, provision is made according to another feature of the present invention that the window mounting or frame is provided for each discharge aperture of the line system for the ventilation of the rear window outer surface at least with one impact or deflector surface arranged above the respective discharge aperture. It is achieved thereby that the water running down along the rear window jumps over the air discharge aperture.

According to another proposal, a roof top is provided whose lower rear cross frame includes an elongated hollow profile member extending essentially in the vehicle longitudinal direction which serves as air channel or duct of the ventilation installation, and in which the lower leg portion of a decorative strip having an acute-angled L-shaped profile is secured at the rear bottom edge of the cross frame. In the application of the present invention to this type of roof top construction, the air guidance for the ventilation of the window outer surface may be so constructed that the top side of the cross frame is provided with one or several discharge apertures for the ventilation of the rear window outer surface and a part of the upper leg portion of the decorative strip projects at a distance above each discharge aperture, and in that the part of the upper leg portion projecting over a discharge aperture extends essentially parallel to the rear window and has a free spacing also with respect to the adjacent frame or mounting of the rear window pane.

The discharge apertures of the ventilation installation are provided in that surface of the rear lower cross frame with the hollow profile, which faces the vehicle body lower part. For the purpose of common water removal of the ventilation system, the discharge apertures of the ventilation installation may be arranged at the lower part of the cross frame.

In one embodiment of the roof top according to the present invention, provision is made that a strip-shaped, inherently rigid shield for the support of the elastic window frame is secured on the top side of the cross frame, and in that the shield is provided with openings arranged within the area of the upper discharge apertures of the cross bearer. This construction offers the advantage that the rubber mounting or frame of the rear window is protected by the shield against the ventilation flow and the shield simultaneously forms a wall of the ventilation channel whose natural forces a ventilation flow essentially parallel to the rear window.

A structurally simple arrangement of this type of construction is achieved in that the edge of the upper leg portion of the decorative strip is constructed uninterruptedly flat essentially over the entire length of the cross frame so that between the shield and the upper leg portion, an uninterrupted continuous gap channel is formed, with which the upper discharge apertures of the cross frame for the ventilation of the rear window outer surface are in communication.

Accordingly, it is an object of the present invention to provide a detachable roof top for motor vehicles which avoids by simple means the aforementioned shortcomings and drawbacks of the prior art.

Another object of the present invention resides in a roof top for motor vehicles which assures proper ventilation of the passenger space of the vehicle while at the same time keeping the rear window free from moisture precipitation as well as ice or snow.

A further object of the present invention resides in a roof top for motor vehicles which achieves an effective ventilation structurally simple means.

Still another object of the present invention resides in a detachable top for motor vehicles which is simple in construction yet provides an effective discharge of any water that may accumulate.

Figure 2:
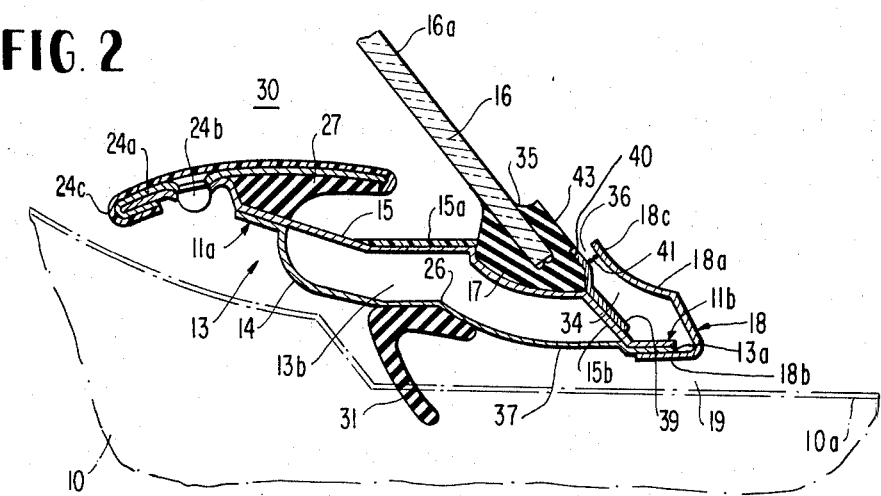

These and other objects, features and advantages of the present invention will become more obvious from the following description when taken in connection with the accompanying drawing which shows, for purposes of illustration only, one embodiment of a roof top in accordance with the present invention, and wherein:

FIG. 1 is a vertical partial longitudinal cross-sectional view through the rear lower cross frame of a "coupe-type" roof top whereby the adjoining contours are shown in perspective view and the plane of cross section passes through the inlet and discharge apertures of the air channels; and FIG. 2 is a partial longitudinal cross-sectional view, parallel to FIG. 1, whose plane of cross section is located outside of the aforementioned air apertures of the cross frame.

Referring now to the drawing wherein like reference numerals are used throughout the two views to designate like parts, reference numeral 10 schematically indicates the vehicle body lower part of a conventional motor vehicle, on which is detachably arranged a roof top (coupe-top) generally designated by reference numeral 12. The lower edge of the roof top 12 is formed by a hollow bearer generally designated by reference numeral 13 which consists of two sheet metal profile elements 14 and 15 connected with each other by welding at the places 11a and 11b. The hollow bearer 13 carries the rear window pane 16 of the roof top whose lower edge, embedded in an elastic window mounting or frame 17, is supported on the hollow bearer 13. The outer edge 13a (FIG. 2) of the hollow bearer 13 projecting rearwardly beyond the window frame 17 is covered by a decorative strip generally designated by reference numeral 18 formed into an L-shaped profile with acute angle in cross section, whose lower leg portion 18b is secured to the bottom side of the edge 13a of the hollow bearer 13.

The hollow bearer 13 follows in its general configuration, on the one hand, the window pane 16 and, on the other, the curvature of the upper closure wall 10a of the vehicle body lower part 10, and more particularly in such a manner that a relatively wide gap channel 19 leading outwardly into the atmosphere remains open between the lower sheet metal profile member 14 of the hollow bearer 13, at the lowest place thereof, and the closure wall 10a.

In the direction toward the interior space 30 of the vehicle, the gap channel 19 is closed off in an air-tight manner by an elastic sealing strip 31, not visible from the outside and substantially also not from the inside, which is adhesively secured at the bottom side of a bend 26 of the lower sheet metal profile member 14.

For the purpose of ventilating the vehicle interior space 30, the upper sheet metal profile member 15 of the hollow bearer 13 is provided with elongated air inlet apertures 22 extending in the vehicle transverse direction. The apertures 22 are covered partially and at a distance by a sheet metal guide plate 24a which is detachably secured at the upper sheet metal profile member 15, for example, snap-fastened or buttoned at 24b and which is covered with a sound-proofing cover 24c in such a manner that the air stream or air flow is deflected approximately by 180° within the area between the discharge out of the vehicle interior space 30 and the inlet into the interior space 13b of the hollow bearer 13 and a sound-proofing is achieved in this manner. For purposes of increasing the last-mentioned effect, the upper sheet metal profile member 15 is also covered with a sound-proofing cover 15a within the area of the apertures 22 whereas for the same purpose a sound-proofing insert 27 is provided between the sheet metal guide plate 24a and the upper sheet metal profile member 15.

According to the present invention, a ventilation stream (indicated in FIG. 1 by arrows 32) is branched off from the air channel or duct system 13b, 19 which keeps the outer surface 16a of the rear window pane 16 free from moisture precipitation as well as from ice and snow. For this purpose, elongated air apertures 33 are provided in the outer part 15b (FIG. 2) of the upper sheet metal profile member 15, i.e., outer with respect to the vehicle passenger space 30, which also extend transversely to the vehicle longitudinal direction. The air apertures 33 are covered by the upper leg portion 18a of the decorative strip 18 at a distance therefrom, whereby the edge 18c of the upper leg portion 18a is constructed essentially flat and is directed parallel to the rear window 16. An uninterrupted, continuous gap channel 34 is left free between the edge 18c and the window mounting 17, through which the ventilating stream 32, starting from the lower edge of the rear window 16 is directed toward the upper edge of the latter.

The outer leg portion 43 of the window frame 17 which is essentially U-shaped in cross section, is provided at its free end with a concave impact or deflection surface 35 extending uninterruptedly over the entire length of the window frame 17, by means of which water guided along the rear window 16 is forced to jump over the discharge aperture 36 of the ventilation channel 34.

Further apertures 38 are arranged in the lower sheet metal profile member 14 at the lowest place 37 of the hollow space 13b which serve as air outlet for the ventilation system (air inlet apertures 22, hollow space 13b) as also for the removal of water from the ventilation channel 34 and the ventilation system 22, 13b.

For the support of the window frame 17, a shield member 39 is secured on the upper side of the upper sheet metal profile member 15 whose portion 40 abutting at the leg portion 43 of the frame 17 has a free spacing 41 with respect to the edge 18c of the decorative strip 18, that determines the width of the gap channel 34. The shield member 39 is provided with openings or apertures 42 which are arranged within the area of the discharge apertures 33 of the upper sheet metal profile member 15 and which permit without impairment the air flow out of the hollow space 13b into the ventilating channel 34.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A roof top for motor vehicles having a vehicle body characterized in that the roof top includes a lower rear cross frame means forming a relatively wide channel gap with the surface of the lower part of the vehicle body, said channel gap terminating at its rear end in the atmosphere, ventilation means in communication with the vehicle passenger space and terminating in said channel gap, said ventilation means and gap channel forming an air-conducting line system, and further means in communication with said line system for supplying air to the outer surface of the rear window, the lower rear cross frame means including an elongated hollow profile member extending in the vehicle longitudinal direction which serves as air channel of the ventilation means and a decorative strip means with a substantially L-shaped acute-angled profile, the lower leg portion of said decorative strip means being secured at the rear bottom edge of the cross frame means.

2. A roof top according to claim 1, characterized in that said further means includes at least one ventilating channel branched off from said line system, whose air flow ventilates the outer surface of the rear window.

3. A roof top according to claim 2, characterized in that at least one discharge aperture means for the ventilation of the rear window outer surface is so arranged that the associated ventilating flow is directed toward the upper window edge.

4. A roof top according to claim 3, characterized in that several discharge aperture means are provided.

5. A roof top according to claim 4, characterized in that said discharge aperture means are arranged at the lower edge of the rear window.

6. A roof top according to claim 4, characterized in that said discharge aperture means are arranged in proximity to the lower window edge.

7. A roof top with a window mounting means according to claim 4, characterized in that the mounting means is provided for each discharge aperture means with at least one deflection surface arranged above the corresponding discharge aperture means.

8. A roof top according to claim 7, characterized in that the top side of the cross frame means is provided with at least one discharge aperture means for the ventilation of the rear window outer surface, in that the upper leg portion of the decorative strip means projects at a distance above each of said last-mentioned discharge aperture means, and in that the portion of the upper leg portion projecting above a respective discharge aperture means extends approximately parallel to the rear window and has a free spacing with respect to the adjacent mounting means.

9. A roof top according to claim 8, characterized in that further discharge aperture means of the ventilation means are provided in the surface of the rear lower cross frame means which faces the vehicle body lower part.

10. A roof top according to claim 9, characterized in that the further discharge aperture means of the ventilation means are arranged at the lowest place of the hollow space in the cross frame means.

11. A roof top according to claim 10, characterized in that a strip-shaped inherently rigid shield means for the support of the elastic window mounting means is secured on the top side of the cross frame means, and in that the shield means is provided with openings within the area of the upper discharge aperture means of the cross frame means.

12. A roof top according to claim 11, characterized in that the edge of the upper leg portion of the decorative strip means is constructed substantially flat and extends uninterruptedly essentially over the entire length of the cross frame means so that a continuous gap channel is formed between the shield means and the upper leg portion of the decorative strip means, the upper discharge aperture means of the cross frame means for the ventilation of the rear window outer surface being in communication with said last-mentioned gap channel.

13. A roof top according to claim 1, characterized in that at least one discharge aperture means for the ventilation of the rear window outer surface is so arranged that the associated ventilating flow is directed toward the upper window edge.

14. A roof top according to claim 13, characterized in that said discharge aperture means are arranged in proximity to the lower window edge.

15. A roof top with a window mounting means according to claim 13, characterized in that the mounting means is provided for each discharge aperture means with at least one deflection surface arranged above the corresponding discharge aperture means.

16. A roof top according to claim 15, characterized in that a strip-shaped inherently rigid shield means for the support of the elastic window mounting means is secured on the top side of the cross frame means, and in that the shield means is provided with openings within the area of the upper discharge aperture means of the cross frame means.

17. A roof top according to claim 1, characterized in that the top side of the cross frame means is provided with at least one discharge aperture means for the ventilation of the rear window outer surface, in that the upper leg portion of the decorative strip means projects at a distance above each of said last-mentioned discharge aperture means, and in that the portion of the upper leg portion projecting above a respective discharge aperture means extends approximately parallel to the rear window and has a free spacing with respect to the adjacent mounting means.

18. A roof top according to claim 1, characterized in that further discharge aperture means of the ventilation means are provided in the surface of the rear lower cross frame means which faces the vehicle body lower part.

19. A roof top according to claim 18, characterized in that the further discharge aperture means of the ventilation means are arranged at the lowest place of the hollow space in the cross frame means.

20. A roof top according to claim 1, characterized in that the edge of the upper leg portion of the decorative strip means is constructed substantially flat and extends uninterruptedly essentially over the entire length of the cross frame means so that a continuous gap channel is formed between the shield means and the upper leg portion of the decorative strip means, the upper discharge aperture means of the cross frame means for the ventilation of the rear window outer surface being in communication with said last-mentioned gap channel.

* * * * *